United States Patent [19]

Schroder

[11] 3,890,604

[45] June 17, 1975

[54] SELECTIVE DIPOLE ORIENTATION OF INDIVIDUAL VOLUME ELEMENTS OF A SOLID BODY

[76] Inventor: Klaus Schroder, 7226 Coventry Rd., East Syracuse, N.Y. 13057

[22] Filed: Nov. 6, 1973

[21] Appl. No.: 413,216

[52] U.S. Cl. .... 340/173.2; 340/173 R; 340/173 RC; 340/173 MS; 340/174 MS

[51] Int. Cl. .... G11c 11/22

[58] Field of Search ...... 340/173 R, 173.2, 173 RC, 340/173 MS, 174 R, 174 MS

[56] References Cited

UNITED STATES PATENTS

| | | | |
|---|---|---|---|
| 3,320,596 | 6/1967 | Smith | 340/174 MS |
| 3,735,369 | 5/1973 | Iida | 340/174 MS |

*Primary Examiner*—Terrell W. Fears
*Attorney, Agent, or Firm*—Charles S. McGuire

[57] ABSTRACT

A system of intersecting elastic waves is applied to a body containing magnetic or ferroelectric particles so that the volume element of said body intersected by the superposed portions of the waves at any given time has a higher energy density than any other portion of the body. Means are provided for applying to the body a magnetic or electrical field, the magnitude of the field and wave energy being so related that the magnetic or electric dipoles of only those individual particles within a volume element at maximum energy density will align with the applied field. Magnetic or electrical sensing means provide an indication of whether or not a field applied to a given volume element has changed the orientation of the dipoles of the magnetic or ferroelectric particles therewithin. The minimum size of the volume elements, and thus the maximum information storage capacity of a body of given size, is governed only by the minimum practical pulse width of the elastic waves.

24 Claims, 6 Drawing Figures

SELECTIVE DIPOLE ORIENTATION OF INDIVIDUAL VOLUME ELEMENTS OF A SOLID BODY

BACKGROUND OF THE INVENTION

This invention relates to control of physical properties of individual volume elements of a solid body by selective orientation of magnetic or ferroelectric dipoles of particles within each volume element.

Some materials exhibit the property of having magnetic or ferroelectric dipoles which align spontaneously in a particular orientation. In the case of ferromagnetic materials such as iron, nickel and cobalt, for example, the magnetic dipoles will spontaneously line up along lines of low magnetic energy below a certain critical temperature. Barium titanate is an example of a material having spontaneously aligned electric dipoles.

Certain physical properties of magnetic and ferroelectric materials are influenced by the dipole orientation of the individual molecules or crystals thereof. Also, dipole orientation of magnetic or ferroelectric material may affect electron distribution in adjacent molecules of a second material which does not exhibit spontaneous dipole orientation, thus influencing the physical properties of the second material. This phenomenon may be put to great advantage if the dipole alignment of relatively small volume elements of a solid body can be individually controlled.

The following discussion will be chiefly directed to an application of the invention in the field of magnetic information storage and retrieval, as applied in digital computers, for example. It will be understood, however, that the scope of application extends to any area wherein selective control of physical properties, such as magnetic, mechanical, electrical, thermal or optical, within discrete volume elements of a solid body is desirable. Thus, while some specific examples of practical applications of the invention are suggested it will be understood that these are for illustrative purposes only and the scope of the invention extends to all areas embraced by the appended claims.

Among the more common means of storing a large number of individual bits of information for later retrieval are magnetic systems employing electrically induced magnetic fields for influencing bodies or particles of magnetic material, and purely electrical or electronic systems. In the most recent computers of large storage capacity, solid-state electronic memories are generally favored due to the small size in which transistors may now be fabricated utilizing thin film, integrated circuit techniques. There is still, of course, a practical limit to the minimum size of a memory unit having a specified storage capacity.

Although magnetic core memories are reliable and durable, among other advantages, a unit of high storage capacity is large and cumbersome due to the relatively large minimum size in which the cores can be produced, and the relatively large number of wires required. Magnetic drum and tape memories require mechanical indexing and drive means, among other disadvantages.

A principal object of the invention is to provide a system for selective control of magnetic or electric dipole orientation within relatively small, individual volume elements of a solid three dimensional body.

Another object is to provide an information storage and retrieval system wherein a much larger number of information bits can be accommodated in the same physical volume than in prior systems.

A further object is to provide a method for storing information in magnetic form in discrete volume elements of a monolithic, three-dimensional body.

Another object is to provide a system for storing information in magnetic form which utilizes elastic waves as a means for identifying the individual element which is subject at any given time to a polarizing magnetic field.

A still further object is to provide a magnetic information storage and retrieval system utilizing electrically induced magnetic fields but requiring a very small number of electrical wires and connections for a large number of information bits.

In a more general sense, the object is to provide novel means of controlling physical properties of discrete volume elements of a solid body.

Other objects will in part be obvious and will in part appear hereinafter.

SUMMARY OF THE INVENTION

In a preferred embodiment, the invention utilizes the dipole alignment properties of ferroelectric, ferromagnetic or ferrimagnetic units, such as clusters, precipitates, inclusions, zones, and the like, distributed more or less uniformly throughout a three-dimensional body of material. The dipole alignment direction of such units is well defined, although the coupling between adjacent units is so weak that the orientation of one unit will not normally affect that of any others. Alignment of the dipole orientation of a given unit with that of an applied field will occur if the field is strong enough. If the energy of an elastic wave is applied to the unit, its dipole orientation may be influenced by a weaker applied field.

From the foregoing, it is apparent that if a discrete portion of body containing such units is excited elastically, a magnetic or electrical field of proper intensity will affect the dipole orientation of only units within that discrete portion. A plurality of elastic waves may be generated to travel through the body in different directions with the energy levels of the individual waves being combined in the area of superposition thereof. The volume encompassed by the superposed portions of the waves is defined by the pulse widths of the waves. Assuming the generation of three pulses of equal width L traveling in mutually perpendicular directions through the body, the superposed portions of the waves will define a cube of dimensions $L \times L \times L$.

According to the present invention, ultrasonic transducers are utilized to produce pulses which travel as elastic waves through a body containing units of the aforementioned type. A plurality of transducers produce waves in timed relation so that the location of the superposed portions of the waves at any given time is known. In one disclosed form, the body is surrounded by a coil through which a current may be passed to generate an induced magnetic field. The magnitude of the induced field is so related to the energy level of the elastic waves and the magnetic force required to affect the magnetization direction of the individual magnetic units within the body that only those units subject to both the combined energy levels of the elastic waves and the applied field will be magnetically aligned with the applied field. Thus, discrete volume elements within the body may be magnetically aligned as desired, by proper timing of the ultrasonic pulses, and control of the current direction through the coil, which determines the direction of the applied field. Thus, discrete volume elements within the body may be magnetically aligned as desired, by proper timing of the ultrasonic pulses, and control of the current direction through the coil, which determines the direction of the applied field.

Information stored in the body by controlling the magnetic alignment of discrete volume elements thereof may be retrieved by a second coil also surrounding the body. A given volume elements is subjected to the combined effects of the elastic waves and magnetizing coil as described above. If the magnetization direction of the magnetic units within this volume element is the same as that of the applied field, no reversal of direction will occur and no time-average voltage will be induced in the second, or sensing coil ( $Vdt = 0$). If the direction of the applied field is opposite to that of the magnetic units, the latter will be reversed to align with the applied field, thereby inducing a voltage in the sensing coil ( $Vdt \neq 0$).

Thus, the magnetization direction of discrete volume elements of a body is controlled by time-related superposition of elastic waves and a magnetic field. The magnitude of the wave and field energy is so related to the energy required to reverse the direction of magnetic alignment of magnetic units within the body that only those units exposed to the combined wave and field energies are susceptible of reversal. In one disclosed form of the invention, as the intercept of three elastic waves, moving in mutually perpendicular directions, travels through the body, the magnetic field is applied for only the time interval during which the superposed portion of the waves is located at the volume element of the body to be magnetized. In another disclosed form, the magnetic field is applied continuously and four elastic waves are generated in timed relation, with one wave moving parallel and opposite to one of the other three, so that all four waves are superposed at only the volume element to be magnetized in traveling through the body. Other forms or modes of specific practice of the invention will be readily apparent from an understanding of the two disclosed forms of wave superposition.

In another disclosed embodiment, the same system of elastic waves creates an identifiable volume element of maximum energy density and an electrical field is applied to the body to influence dipole orientation of ferroelectric units within the volume element.

DETAILED DESCRIPTION

Figures 1, 2, 3, 6:
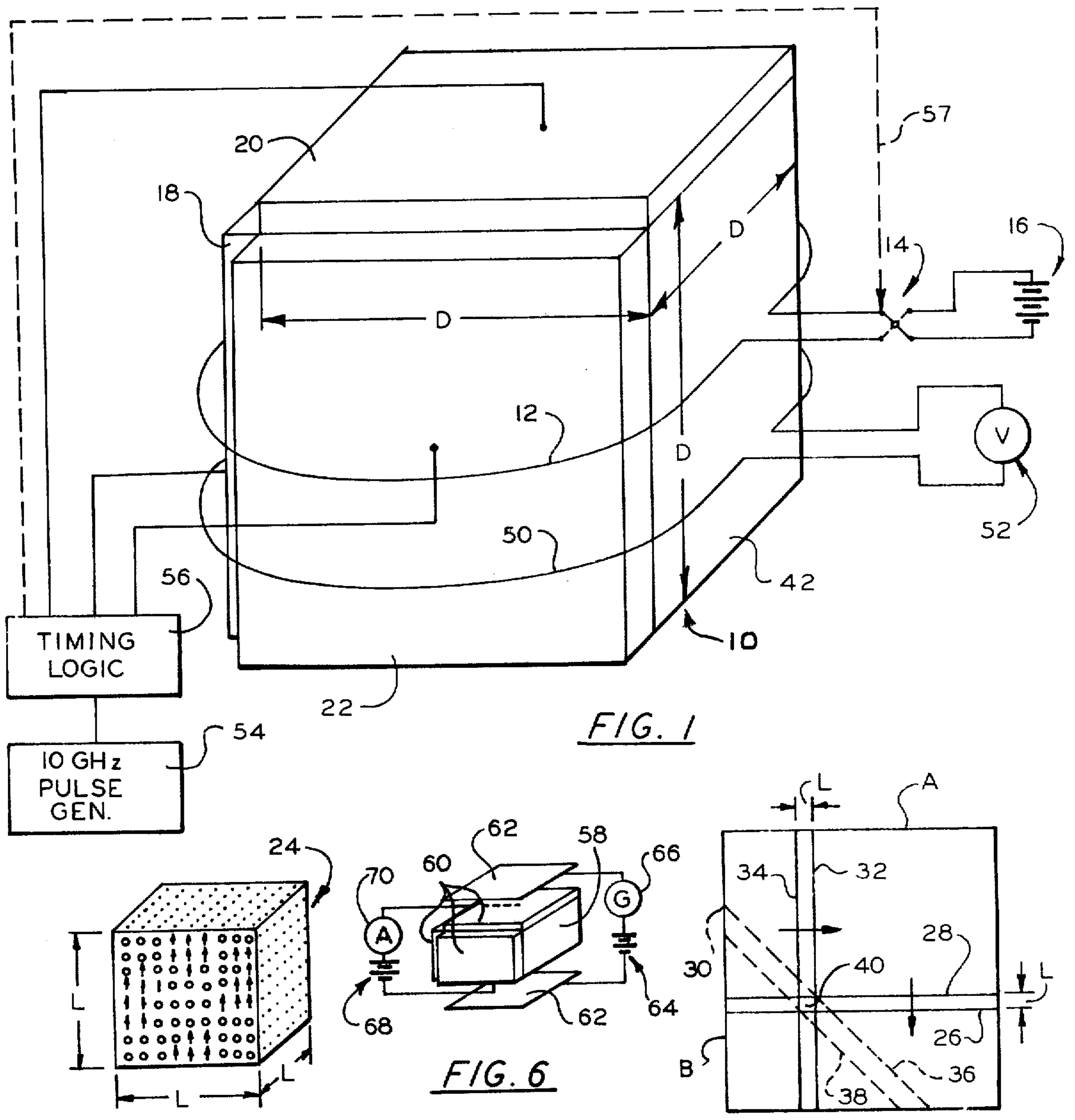
FIG. 1 is a somewhat diagrammatic, perspective view of an arrangement for practising one form of the invention.
FIG. 2 is a diagrammatic, perspective view of a greatly enlarged portion of FIG. 1.
FIGS. 3–5 are graphical representations of elastic wave systems traveling through a solid body.
FIG. 6 is a diagrammatic, perspective view of another embodiment of the invention.

In FIG. 1 is shown a solid body 10 in the form of a cube having sides of length D. Body 10 is composed of a mixture of both magnetic and non-magnetic materials. The most common magnetic materials are the elements iron, cobalt and nickel, which are ferromagnetic below a certain critical temperature, unique to each element, and paramagnetic above such temperature. For purposes of the present disclosure it will be assumed in all cases that body 10 is below the critical temperature of the magnetic material contained therein. For convenience the material is referred to merely as "magnetic", it being understood that the magnetic properties of a given atomic or crystalline unit thereof may be more specifically described as ferromagnetic, ferrimagnetic, etc.

A common example of a suitable composition of body 10 is an alloy comprising a mixture of copper and nickel in properties of approximately 60–40, respectively. It is well known that clusters or zones of nickel atoms within the body will line up in well defined crystallographic orientations, along directions of low magnetic crystal anisotropy energy. These clusters, which occur naturally and randomly throughout the body, are hereinafter referred to as "magnetic units". These units are so weakly coupled magnetically that the magnetization direction in one unit will not affect the magnetic orientation of adjacent magnetic units. Other examples of suitable materials of which body 10 may be composed are iron oxide or chromium oxide powders, of the type presently used in magnetic tapes, in a plastic support, or a powder of fine iron particles in copper. In the latter case, the iron particles should be as small as possible (e.g., $10^{-5}$ cm diameter) and could comprise approximately 10 percent of the total volume of body 10. The foregoing examples are provided by way of illustration only, and the present invention is not directed to nor limited by the particular mixture, alloy, or other material, or method of preparation thereof, of which body 10 is composed, only the magnetic properties thereof as previously described being critical to operation of the invention.

The magnetic units of body 10 will be magnetically aligned in a random manner unless exposed to an applied field of sufficient magnitude to influence the direction of alignment thereof. This magnitude may be obtained experimentally or calculated by known techniques, given the particular composition of body 10. Coil 12 surrounds body 10 and is connected through switch 14 to a suitable source of electrical energy 16 so that a current may be selectively passed in either direction through the coil. An induced magnetic field is, of course, produced by the passage of current through the coil, the magnitude of the field being commensurate with the number of turns and strength of the current, and the direction being commensurate with the direction of current travel.

Means are provided for generating a system of elastic waves in body 10, such means being indicated diagrammatically in FIG. 1 by blocks 18, 20 and 22 which represent ultrasonic transducers of known design. Transducers 18, 20 and 22 are positioned on mutually perpendicular faces of body 10, and are preferably glued or otherwise solidly affixed to the surfaces to avoid air gaps which could introduce mechanical problems. An electronic triggering device, described later herein, is connected to transducers 18, 20 and 22 to cause generation by each of an elastic wave, having a pulse width commensurate with the physical design of the transducers and a maximum energy density of known value.

The waves generated by transducers 18, 20 and 22 will travel through the body 10 at the velocity of sound in the material thereof. The wave energy will be transmitted to the portions of body 10 through which the waves are passing at any given time. The stress energy in a volume element of the body lowers the required magnitude of an applied magnetic field for aligning therewith the magnetization direction of the magnetic units within such volume element.

If each of the waves has a pulse width L then the volume of that portion of body 10 occupied at any given time by these three waves (i.e., the volume of wave intersection) is $L^3$. In FIG. 2 is shown a volume element 24 of dimensions L×L×L taken from body 10. The small arrows on the front surface of element 24 represent schematically the individual crystals of magnetic material (nickel or nickel-rich) and the small circles the crystals of non-magnetic material (copper or copper-rich). The direction of the arrows indicates the direction of magnetization, it being assumed for purposes of the present discussion that magnetization is stable in either the up or down direction only. The groupings of the arrows indicate the aforementioned magnetic clusters which are, of course, distributed at random throughout block 10 and therefore throughout volume element 24 thereof. The volume elements may be extremely small without substantial liklihood of any given element containing no magnetic clusters susceptible of magnetic alignment. For example, D may be one centimeter and L, $10^{-4}$ cm, an elastic pulse width of this size being well within practical limits.

Referring now to FIG. 3, there is shown in two dimensions a graphical representation of two waves traveling in perpendicular directions through one vertical plane of body 10. An ultrasonic wave is first generated at surface A, having a pulse width L, the leading and trailing edges of the pulse being denoted in the position shown by reference numerals 26 and 28, respectively. When trailing edge 28 has reached point 30 on surface B, a second wave is generated, having leading and trailing edges 32 and 34. Thus, the superposed portions of the two waves, traveling at equal velocities v, moves at a 45° angle to the two waves, along the path between dotted lines 36 and 38. A third wave, traveling in a direction mutually perpendicular to those shown (i.e., in a plane parallel to the surface of the illustration), may be superposed with the first two waves at some position along the path between dotted lines 36 and 38, for example, that indicated at 40. Assuming the pulse width of the third wave to be L, the volume of the superposed portions of all three waves will be a cube having dimensions L×L×L. If L is $10^{-4}$ cm then the volume of the cube defined by the superposed portions of all three waves is $10^{-12}cm^3$.

Assuming the peak energy density of each of the three waves to be equal, and defining this energy as $E_0$, the maximum energy density within the volume element encompassed by the superposed portions of the three waves is $3E_0$. The position of the specific volume element of body 10 which is exposed to maximum energy density $3E_0$ at any given time may be calculated from the times at which the three waves are generated and the velocity of sound in body 10. The strength of a magnetic field which will produce alignment therewith of magnetic units in a portion of body 10 exposed to an elastic wave energy density of $3E_0$, but which will not produce alignment of units exposed to an energy density of $2E_0$ or less, is defined as H. A current of proper magnitude to create an induced field of magnitude H is passed through coil 12 in timed relation to movement of the three waves through body 10 to produce a known magnetic alignment of the magnetic units within a known volume element of body 10. Thus, each discrete volume element $L^3$ may be "programmed" in this manner, resulting in a maximum storage capacity in body 10 of $10^{12}$ bits of information, assuming D=10,000 L.

In the above described form of the invention, the current is passed through coil 12 to create the induced magnetic field only at that time interval during which the three waves are superposed at the particular volume element of body 10 to be programmed. To eliminate the need for switching the current through coil 12 in timed relation to generation of the elastic waves, a second form of the invention allows the magnetic field to be applied continuously. A fourth transducer is provided on the surface of body 10 denoted by reference numeral 42. A wave generated by a transducer on this surface will travel through body 10 in a plane parallel and a direction opposite to a wave generated by transducer 18.

Figure 4:
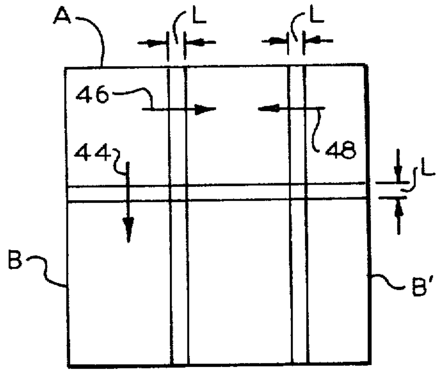

In FIG. 4 is shown in two dimensions, a wave generated at surface A (e.g., by transducer 20) and traveling in the direction of arrow 44. Waves generated at surfaces B and B' (e.g., by transducer 18 and the fourth transducer at surface 42 of body 10) are also shown, traveling in the directions of arrows 46 and 48, respectively.

Figure 5:
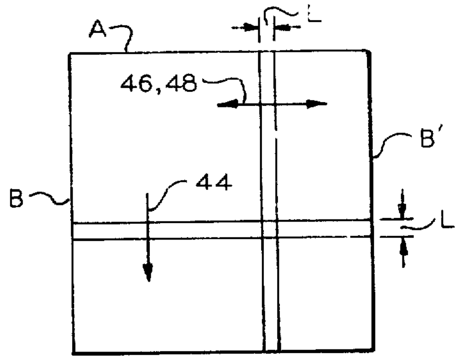

In FIG. 5 the waves generated at surfaces B and B' are superposed with one another as well as with the wave generated at surface A. If a wave is generated to travel in a plane parallel to the illustration, i.e., in a direction perpendicular to the plane of the paper, it may be properly timed to intersect the plane of the paper concurrently with superposition of the other three waves. That is, the waves from surfaces B and B' will pass through one another at the same time that the other two waves are superposed therewith. Thus, a discrete volume element of body 10 may have a maximum elastic wave energy density of $4E_0$ applied thereto. The strength of the magnetic field induced by the continuous current through coil 12 is defined as H', which is sufficient to cause a reversal of magnetization direction of magnetic units at energy density 4E, but insufficient to cause reversal of those units at $3E_0$ or less.

Once body 10 has been programmed by selective alignment of the magnetic units within discrete volume elements thereof, the programmed information may be retrieved in a manner analogous to that employed in core memory systems. That is, a sensing coil is provided to detect whether or not the magnetic alignment of a given element is reversed in response to an applied field in a known direction. Referring again to FIG. 1, coil 50 surrounds body 10 and is connected to a voltage-sensing instrument of suitable sensitivity, schematically indicated as voltmeter 52, for detecting the presence of a voltage in coil 50 induced by a reversal of magnetization direction of the magnetic units within a volume element of body 10. Electronic impulses are applied to the respective transducers at the proper times to produce the desired wave patterns by conventional means, indicated in FIG. 1 as pulse generator 54 connected to the transducers (and to switching means for coil 12, when necessary) through timing logic 56 comprising counters, gates, dividers, etc.

When information is to be read from a given volume element the elastic waves are again generated by the transducers in the same time relationship as when that element was initially programmed. Thus, the waves will again be in superposed relation at that volume element and an induced field is applied by passage of current in a known direction through coil 12. The applied field is again of intensity H or H', depending on whether three or four elastic waves are used, thus being of proper intensity to align the magnetization direction of magnetic units at a high enough energy level. If the applied field is in, say, the up direction and the magnetization direction of magnetic units within the volume element simultaneously intersected by all waves is also up, no reversal of magnetization direction will occur and no voltage will be induced in coil 50. If, however, the applied field is up and the magnetic particles of the given volume element were previously aligned in the down direction, a reversal of direction will occur with consequent induction of a voltage in coil 50. Again, the induced field is applied only for the time during which the three waves are superposed at the volume element to be read, in the form utilizing three transducers, or continuously, in the form utilizing four transducers with the four waves being superposed at only the volume element to be read.

Since programmed information may be destroyed by reversing the magnetization direction during retrieval, a second body with coils and transducers would normally be electrically coupled to body 10. The magnetizing coil of the second body would be coupled to sensing coil 50 of body 10, and the transducers would be triggered to produce identical wave systems in the two bodies. The current direction through the magnetizing coil of the second body would be such as to produce an applied field direction matching that of the magnetization directon of the corresponding volume element in the first body, regardless of whether the direction is reversed during sensing or not. That is, since the applied field from magnetizing coil 12 is in the up direction when a given volume element in body 10 is "read", or probed, an applied field from the magnetizing coil of the second body is also in the up direction at this time unless a voltage is induced in sensing coil 50, indicating a reversal of magnetization direction of the magnetic units in the volume element of body 10 being probed. In this case, the induced voltage in coil 50 is used to reverse the current direction through the magnetizing coil of the second body, thereby aligning the magnetization direction of the corresponding volume element thereof in the direction of the probed element prior to reversal. This technique is also analogous to that used in core memory systems to preserve programmed information during retrieval and is therefore well understood and not illustrated in detail herein.

In FIG. 6 is shown a different embodiment of the invention which depends for its operation upon orientation of electric rather than magnetic dipoles. Body 58 is prepared from a material having particles or inclusions of ferroelectric material in clusters, in the same general manner of the magnetic material of body 10. For example, body 58 may be formed of a mechanical mixture of barium titanate in a silicon support, the proportion of barium titanate being on the order of 5 to 10 percent, although such example is given for illustrative purposes only.

Transducers 60 are provided on three mutually perpendicular sides of the body 58 in exactly the same way as transducers 18, 20 and 22 with respect to body 10. Again, either three or four transducers may be used in the aforedescribed manner to create the intersecting elastic wave pattern in either of the two modes of operation. Means (not shown in FIG. 6) would be provided as before to trigger the transducers in properly timed relation.

Plates 62 are positioned on opposite sides of body 58, in spaced relation thereto, for creating an electrical field to which body 58 and the ferroelectric particles therein are subjected. Battery 64, or other suitable source of EMF, is suitably connected to apply a desired charge to plates 62. The intensity of the electrical field created by the charge on plates 62 is sufficient to align the electric dipoles of the ferroelectric material in the volume element of body 58 at maximum energy density, i.e., that volume element in which all waves are superposed, but insufficient to align dipoles in other portions of body 58.

Thus, discrete volume elements of body 58 may be "programmed" by selective alignment of the electric dipoles of a ferroelectric material within a solid body. The dipole linkage between molecules or crystals of the ferroelectric material in adjacent volume elements is, of course, too weak for alignment in one volume element to influence that in other volume elements. The manner of employment or application of this embodiment of the invention may, for example, be the same as that previously discussed in connection with alignment of magnetic dipoles. That is, body 58 may comprise the memory unit of a computer with information stored in the form of electric dipole alignment of individual volume elements of the body. The information may be retrieved by again creating the elastic wave pattern to produce a maximum energy density in a given volume element, and subjecting body 58 to the electrical field created by the charge on plates 62. If the known direction of the applied field produces a change in electric dipole orientation within the given volume element, a measurable response will be apparent in galvanometer 66 (or other suitable instrument) included in the circuit of plates 62. If no response is apparent, this indicates that no alteration of dipole orientation has occurred, the previously programmed alignment being the same as the direction of the applied field.

It is also pointed out that dipole orientation of the ferroelectric material of body 58 may be utilized to influence electron distribution in adjacent atoms of the second material of body 58. That is, one of the materials of which body 58 is composed is a ferroelectric material (i.e., electric dipoles will spontaneiously align in a well-defined direction), and one of more other materials wherein dipoles will not spontaneously align are also present. Physical properties such as thermal and electrical conductivity, optical, and other characterstics, may be directly influenced by the distribution of electrons in the molecules of these other materials. Since dipole orientation of the ferroelectric material within a given volume element will influence electron distribution in molecules of other materials within that volume element, the disclosed means of selective dipole orientation may be used to control selected physical properties of body 58.

An additional feature of the present embodiment is the capability of selectively controlling electrical characteristics of individual volume elements to create within body 58 actual electrical circuits. For example, if the non-ferroelectric material is a semi-conductor material, the space charges therein may be modified by the dipole orientation of adjacent ferroelectric molecules to control, for example, the p or n-type character of selected portions of such material. Thus, a network of interconnected transistors, resistors, etc., may be created by selective dipole alignment within discrete volume elements of body 58 in the manner described. The presence of such a circuit is schematically indicated in FIG. 6 by battery 68 and ammeter 70, with electrical leads therefrom extending to connections with terminals on opposite sides of body 58. The terminals may comprise a thin layer of conducting material coated on one entire surface of body 58; if a transducer is provided on the same surface, the conducting layer is between the transducer and the surface of body 58.

From the foregoing, it may be seen that the scope of the invention extends to controlling physical properties in a solid body by combined elastic wave and magnetic or electrical field influence on dipole orientation of magnetic and/or ferroelectric materials within the body. Although two modes of operation (utilizing three and four elastic waves, respectively) were suggested for each of two embodiments (magnetic and electric), it is readily apparent that many modifications are possible. For example, the solid body may be elongated (such as a wire, or thin rod) and a single elastic wave utilized, the dimensions of a "volume element" thus being defined by the cross sectional area of the body and the pulse width of the wave. Furthermore, the invention contemplates the use of both magnetic and ferroelectric particles in a single body acted on by both magnetic and electrical fields to further increase the storage capacity of a given body by allowing information to be stored in both magnetic and electrical form within each discrete volume element. An additional feature of the invention is the possibility of providing several magnetizing and sensing coils and/or condenser plates to allow information to be stored and read in more than only two orientations (basic binary form). While the present discussion has been limited to dipole orientations in either the up or down direction, some materials may be influenced by applied fields to align the dipoles thereof in any of several (e.g., six or eight) different directions, each representing a different bit of information.

What is claimed is:

1. A system of controlling the physical properties of individual volume elements of a body of solid material by selective orientation of magnetic or ferroelectric dipoles of particles within the body, said system comprising:

a. a solid body having within each volume element thereof a first material characterized by having spontaneously alignable dipoles and a second, non-alignable material, the dipole linkage of individual particles of said first material being such that the dipole orientation within one volume element is insufficient to change the dipole orientation within other volume elements;

b. means for applying to said body at least one elastic wave, having a predetermined energy density and a pulse width defining the dimensions of said volume element, to travel through said body at a known velocity, thereby producing a maximum energy density in a given volume element of said body at a given time; and c. means for applying to at least that portion of said body including said given volume element a field of predetermined intensity and orientation, the combined energy levels of said wave and said field being sufficient to change the dipole orientation of said first material within said given volume element, the individual energy levels of said wave and said field being insufficient to change the dipole orientation of said first material.

2. The invention according to claim 1 wherein said first material is a magnetic material and said field is a magnetic field.

3. The invention according to claim 2 and further including an electrical coil surrounding said body and means for passing a current through said coil, thereby inducing said magnetic field.

4. The invention according to claim 2 and further including means for sensing a change in the dipole orientation of said magnetic material in response to application of said magnetic field.

5. The invention according to claim 1 wherein said first material is a ferroelectric material and said field is an electrical field.

6. The invention according to claim 5 and further including a pair of plates arranged on opposite sides of said body, in spaced relation thereto, and means for applying a charge to said plates.

7. The invention according to claim 5 and further including means for sensing a change in the dipole orientation of said ferroelectric material in response to application of said electrical field.

8. The invention according to claim 5 wherein at least a portion of said second material is so arranged with respect to said first material that dipole orientation of said first material influences electron distribution in said portion of said second material.

9. The invention according to claim 8 wherein said second material is a semi-conductor material.

10. The invention according to claim 8 and further including a pair of leads electrically connected to said body for passage of current directly therethrough.

11. A method of storing information in a solid body in the form of dipole orientation, said method comprising:

a. applying a system of elastic waves having a predetermined elastic energy density to a solid body containing within each volume element thereof a first material characterized by having spontaneously alignable dipoles and a second, non-alignable material, the dipole linkage of individual particles of said first material being such that the dipole orientation within one volume element is insufficient to change the dipole orientation within other volume elements, said waves traveling through said body to produce a maximum energy density in a given volume element at a given time; and b. applying a field of predetermined orientation to said given volume element at said given time, the combined energy levels of said maximum energy density and said field being sufficient to change the dipole orientation of particles of said first material within said given volume element, the individual energy levels of said maximum energy density and field being insufficient to effect such change.

12. The invention according to claim 11 wherein said body is a cube.

13. The invention according to claim 11 wherein said elastic waves are ultrasonic waves.

14. The invention according to claim 11 wherein at least two of said waves travel in perpendicular directions through said body, said given volume element being defined by the volume occupied at any given time by all of said waves.

15. The invention according to claim 14 wherein said field is applied for a discrete time interval corresponding substantially to the time a discrete volume element to be operated on is occupied by all of said waves.

16. The invention according to claim 14 wherein three waves of discrete pulse length travel through said body in respective directions such that the superposed portions of the three waves travel in a line through said body and said field is applied continuously.

17. The invention according to claim 16 wherein the pulse lengths of all of said waves are equal.

18. The invention according to claim 11 wherein four waves of discrete pulse length travel through said body to mutually overlap at only one volume element of said body, for each complete travel of the waves therethrough.

19. The invention according to claim 18 wherein said field is applied continuously, whereby said one volume element is subject to the energy levels of all of said waves and said field.

20. The invention according to claim 11 wherein said first material is a magnetic material and said field is a magnetic field.

21. The invention according to claim 11 wherein said first material is a ferroelectric material and said field is an electrical field.

22. A method storing and retrieving information, comprising:

a. applying a system of elastic waves having a predetermined elastic energy density to a solid body containing within each volume element thereof a first material characterized by having spontaneously alignable dipoles and a second, non-alignable material, the dipole linkage of individual particles of said first material being such that the dipole orientation within one volume element is insufficient to change the dipole orientation within other volume elements, said waves traveling through said body to produce a maximum energy density in a given volume element at a given time; and b. applying a field of predetermined orientation to said given volume element at said given time, the combined energy levels of said maximum energy denstiy and said field being sufficient to change the dipole orientation of particles of said first material within said given volume element, the individual energy levels of said maximum energy density and field being insufficient to effect such change; and c. sensing the presence of an induced electrical signal in an instrument sensitive to dipole orientation changes in said volume element.

23. The invention according to claim 22 wherein said first material is a magnetic material, said field is a magnetic field and said instrument is connected to a coil surrounding said body.

24. The invention according to claim 22 wherein said first material is a ferroelectric material, said field is an electrical field and said instrument is connected to a pair of plates on opposite sides of said body.

* * * * *